United States Patent
Shalev et al.

(10) Patent No.: US 7,773,779 B2
(45) Date of Patent: Aug. 10, 2010

(54) BIOMETRIC SYSTEMS

(75) Inventors: Baruch Shalev, Kiryat-Bialik (IL);
Vitaly Portnoy, Haifa (IL)

(73) Assignee: I.Q.S. Shalev Ltd., Ramata Gan (IL)

( * ) Notice: Subject to any disclaimer, the term of this patent is extended or adjusted under 35 U.S.C. 154(b) by 255 days.

(21) Appl. No.: 11/583,044

(22) Filed: Oct. 19, 2006

(65) Prior Publication Data
US 2008/0095410 A1 Apr. 24, 2008

(51) Int. Cl.
*G06K 9/00* (2006.01)

(52) U.S. Cl. .............. 382/115; 382/100; 382/305; 235/380; 235/382; 705/51

(58) Field of Classification Search ........... 382/100, 382/115, 305; 235/380, 382; 713/186, 184; 715/767, 811; 705/51, 64, 167
See application file for complete search history.

(56) References Cited

U.S. PATENT DOCUMENTS

| | | | |
|---|---|---|---|
| 5,805,719 A | | 9/1998 | Pare, Jr. et al. |
| 6,848,052 B2 * | | 1/2005 | Hamid et al. ............... 713/186 |
| 6,928,546 B1 | | 8/2005 | Nanavati et al. |
| 6,928,547 B2 | | 8/2005 | Brown et al. |
| 6,985,887 B1 | | 1/2006 | Sunstein et al. |
| 7,003,670 B2 | | 2/2006 | Heaven et al. |
| 7,043,754 B2 | | 5/2006 | Arnouse |
| 7,047,419 B2 | | 5/2006 | Black |
| 7,424,618 B2 * | | 9/2008 | Roy et al. .................. 713/186 |
| 2002/0174347 A1 * | | 11/2002 | Ting ........................ 713/186 |
| 2005/0018883 A1 * | | 1/2005 | Scott ......................... 382/115 |
| 2006/0106734 A1 | | 5/2006 | Hoffman et al. |
| 2007/0174206 A1 * | | 7/2007 | Colella ...................... 705/64 |
| 2008/0095410 A1 | | 4/2008 | Shalev et al. |

FOREIGN PATENT DOCUMENTS

WO  WO 2008/047356  4/2008

OTHER PUBLICATIONS

International Search Report Dated Sep. 15, 2008 From the International Searching Authority Re.: Application No. PCT/IL07/01240.
Written Opinion Dated Sep. 15, 2008 From the International Searching Authority Re.: Application No. PCT/IL07/01240.

* cited by examiner

*Primary Examiner*—Samir A. Ahmed
*Assistant Examiner*—Ali Bayat
(74) *Attorney, Agent, or Firm*—The Law Office of Michael E. Kondoudis

(57) ABSTRACT

A system for providing global biometric identification services to a plurality of remote parties, the system comprising: a template receiver, which comprises: a registration input configured to receive from at least one remote registering party at least one registration template of a biometric sample of an end user of the remote registering party, associated with a tag relating the template to the end user, and an enquiry input, configured to receive from a remote inquiring party at least one test template of a biometric sample of a person. The system also comprises a verifier, associated with the inputs, configured to determine a degree of match between the registration template and the test template, thereby to verify the person as an end user, using the determined degree of match.

25 Claims, 11 Drawing Sheets

BIOMETRIC SYSTEMS

FIELD AND BACKGROUND OF THE INVENTION

The present invention relates to biometrics and, more particularly, but not exclusively to a system and method for providing a biometric identification service.

Biometric identification refers to the automatic identification of a person based on his/her physiological or behavioral characteristics. This method of identification is preferred over more traditional methods involving passwords and PIN numbers for various reasons: (i) the person to be identified is required to be physically present at the point-of-identification; (ii) identification based on biometric techniques obviates the need to remember a password or carry a token.

Specifically, with increased use of computers as vehicles of information technology, it is necessary to restrict access to sensitive/personal data. By replacing PINs, biometric techniques can potentially prevent unauthorized access to or fraudulent use of ATMs, cellular phones, smart cards, desktop PCs, workstations, and computer networks. PINs and passwords may be forgotten, and token based methods of identification like passports and driver's licenses may be forged, stolen, or lost.

Thus biometric based systems of identification are receiving considerable interest. Various types of biometric systems are being used for real-time identification, the most popular are based on face, iris and fingerprint matching. However, there are other biometric systems that utilize retinal scan, speech, signatures and hand geometry.

Biometric identification and authentication systems were introduced into a variety of processes implemented by organizations such as financial institutions, medical institutions, government organizations, etc.

For example, U.S. Pat. No. 7,047,419 to Black et al, filed on Oct. 28, 2001, entitled: "Data Security System", describes a data security system which comprises a host processor, and a plurality of remote computers. Each remote computer provides biometric authentication of a user prior to responding to the user request for data access. The remote computers are handheld when in operational mode. A sensor in the handheld computer captures a biometric image while the remote computer is being used. The biometric sensor is positioned in such a way that the sensor enables the capture of the biometric image continually during computer usage with each request for access to secure data. The biometric authentication occurs in a seamless manner and is incidental to the data request enabling user identity authentication with each request to access secure data.

U.S. Pat. No. 7,043,754 to Amouse et al, filed on Jun. 12, 2003, entitled "Method of secure personal identification, information processing, and precise point of contact location and timing", describes a lightweight and easily carried memory identification card. The memory card includes a file system of electronic files on the card, which are automatically detected and recognized by selected authorized readers. The file system is organized so that stored electronic files appear in separate and distinct encrypted compartments in the card, so that only authorized preselected readers have access to particular compartments. Biometric identifying information is imprinted in the card, so that no data can be transferred unless there is a biometric match between a reader and a person assigned to the card and who possesses the card. The separate compartments of the memory card may include a compartment containing medical, administrative or financial information relating to the assigned user of the card, wherein the information is accessed only by a preselected memory card reader having the unique pin code assigned to the compartment having the medical information. The memory identification card can also have a single chip Global Positioning System (GPS) to identify where the card is being used.

U.S. Pat. No. 7,003,670 to Heaven et al, filed on Jun. 8, 2001, entitled "Biometric Rights Management System", describes an apparatus and method for using biometric information to control access to digital media that is obtained over a network such as the Internet. Encryption, techniques are used in combination with biometric verification technology to control and monitor access to online or locally held media. Biometrics such as keystroke dynamics are measured at a user's computer to confirm the identity of a user for the purpose of allowing the user to audit music files to which the user has authorized access.

U.S. Pat. No. 6,985,887 to Sunstein et al, filed on Nov. 24, 1999, entitled "Apparatus and method for authenticated multi-user personal information database", describes a method of assuring integrity of personal information in a data base. The database contains personal information provided by multiple users. In various embodiments, physiological identifiers associated with each of the users are stored in the database. Related systems are also described by Sunstein et al.

U.S. Pat. No. 6,928,547 to Brown et al, filed on Jul. 7, 2003, entitled "System and method for authenticating users in a computer network", introduces a rule based biometric user authentication method and system in a computer network environment. Multiple authentication rules can exist in the computer network. For example, there may be a default system-wide rule, and a rule associated with a particular user trying to log in. There may be other rules such as a rule associated with a remote computer from which the user is logging in, a rule associated with a group to which the user belongs, or a rule associated with a system resource to which the user requires access such as an application program or a database of confidential information. An order of precedence among the rules is then established which is used to authenticate the user.

U.S. Pat. No. 6,928,546 to Nanavati et al, filed on May 14, 1999, entitled "Identity verification method using a central biometric authority", describes a method for performing biometric verifications, to authenticate the identification of users using a central biometric authority (CBA). This allows parties to an electronic transaction to be assured of each other's identity. Specifically, at the sender side, a first message to a receiver is generated, wherein the first message includes a message text and a unique message identifier (UMI).

At the sender side, a second message concerning a posting to the CBA is also generated, wherein the second message includes the sender's biometric sample, the UMI, and the sender's submission profile record. At a receiver side, it is decided that if a receiver wishes to verify the sender's identity and if so, the first message is automatically verified. At the receiver side, a third message concerning a receiver's posting to the CBA is issued, the third message including only the UMI, as received from the sender side. Finally, at the CBA, a reply to the third message is provided, the reply including the sender's verification result.

Implementations of current biometric identification solutions, such as the ones described hereinabove, are specific with regards to the biometric equipment used.

Furthermore, with the current solutions, an organization may have to develop, buy, or install a complete biometric system including: biometric readers, computer drivers to control the biometric readers, software for generating biometric signatures (templates) from the read biometric values (say the from the image of a fingerprint read by a biometric reader), software for processing the biometric data read and comparing the processed biometric data with existing biometric data (say for authentication or identification of end users), dedicated databases to store the biometric data, etc.

A complete biometric system may be too expensive to buy and maintain, specifically for a relatively small business, which may not have experienced IT workers, and cannot finance the development of a complete biometric system which suits the needs of the business.

For example, a small drugstore chain is not likely to have the resources to develop a complete end-to-end system for biometric identification, say for controlling the distribution of prescription narcotic pain relievers by the chain's staff.

There is thus a widely recognized need for, and it would be highly advantageous to have, a system devoid of the above limitations.

SUMMARY OF THE INVENTION

According to one aspect of the present invention there is provided a system for providing global biometric identification services to a plurality of remote parties, the system comprising: a template receiver, comprising: a) a registration input configured to receive from at least one remote registering party at least one respective registration template of a biometric sample of an end user of the remote registering party, associated with a tag relating the template to the end user; and b) an enquiry input, configured to receive from a remote inquiring party at least one test template of a biometric sample of a person; and a verifier, associated with the template receiver, configured to determine a degree of match between the registration template and the test template thereby to verify the person as an end user, using the determined degree of match.

According to a second aspect of the present invention there is provided a system for providing global biometric identification services to a plurality of remote parties, the system comprising a sample receiver, comprising: a) a registration input configured to receive from at least one remote registering party at least one registration biometric sample of a respective end user of the remote registering party, associated with a tag relating the biometric sample to the end user; and b) an inquiry input configured to receive from a remote inquiring party at least one test biometric sample of a person; and a template extractor, associated with the sample receiver, configured to extract a template from each of the received biometric samples; and a verifier, associated with the template extractor, configured to determine a degree of match between the template extracted from the test sample and at least one of the templates extracted from the registration samples, thereby to verify the person as an end user, using the determined degree of match.

According to a third aspect of the present invention there is provided a method for providing global biometric identification services to a plurality of remote parties, the method comprising: receiving from at least one remote registering party at least one registration biometric sample of a respective end user of the remote registering party, associated with a tag identifying the biometric sample as belonging to an end user of the registering party; extracting a template from each of the received registration biometric samples; receiving from a remote inquiring party at least one test biometric sample of a person; extracting a template from the test biometric sample; and determining a degree of match between the template extracted from the test biometric sample and at least one of the templates extracted from the registration samples, and verifying the person as an end user, using the determined degree of match.

According to a fourth aspect of the present invention there is provided a method for providing global biometric identification services to a plurality of remote parties, the method comprising: receiving from at least one registering party at least one registration template of a biometric sample of a respective end user of the remote registering party, associated with a tag relating the template to the end user; receiving from a remote inquiring party at least one test template of a biometric sample of a person; and determining a degree of match between the test template and at least one of the registration templates, and verifying the person as an end user, using the determined degree of match.

According to a fifth aspect of the present invention there is provided a system for providing global biometric identification services to a plurality of remote parties, the apparatus comprising: a time manger, configured to receive from at least one remote registering party at least one registration biometric sample of a respective end user of the remote registering party, associated with a tag relating the registration biometric sample to the end user, wherein the time manager is further configured to receive from a remote inquiring party at least one test biometric sample of a person; a template extractor, associated with the time manager, configured to extract a template from each of the biometric samples; and a verifier, associated with the template extractor, configured to determine a degree of match between the template extracted from the test biometric sample and at least one of the templates extracted from the registration samples, and to verify the person as an end user, using the determined degree of match, wherein the time manager is further associated with the verifier, and further configured to record time of reception of the test biometric sample, as a time event of the tag associated with the template matched by the template extracted from the test biometric sample.

According to a sixth aspect of the present invention there is provided a client agent for providing global biometric identification, embodied on a computer readable medium, the agent comprising a template extractor, configured to automatically determine which type of biometric characteristic is sampled in a received biometric sample, and extract a template from the biometric sample, in accordance with the determined type.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
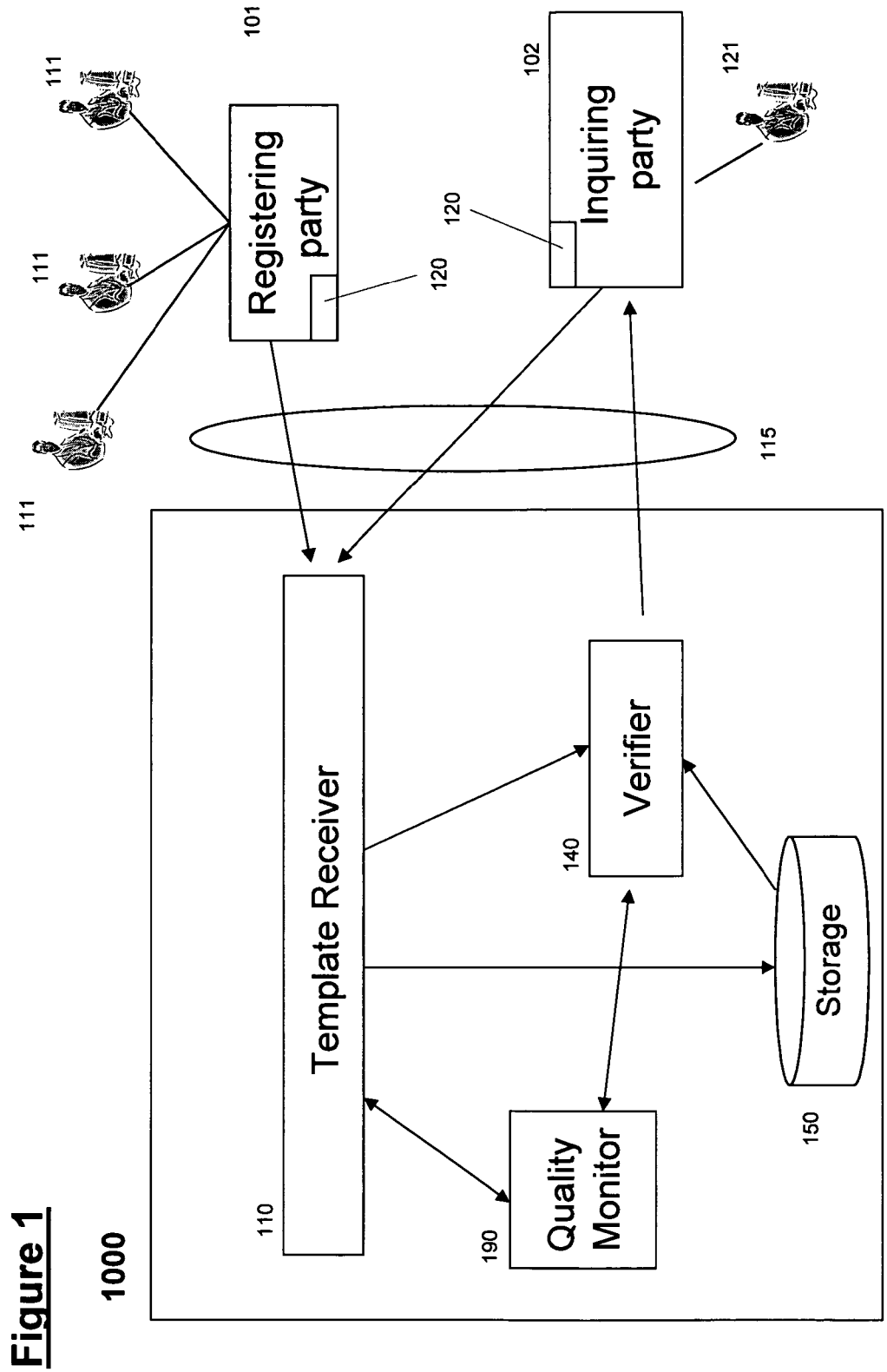
FIG. 1 is a block diagram illustrating a system for providing global biometric identification services to a plurality of remote parties, according to a preferred embodiment of the present invention.

The present embodiments comprise a system and method, for providing biometric verification services to a plurality of remote parties. Preferably, the services are provided to the remote parties through the Internet.

Preferred embodiments of the present invention aim at providing a system, which supports a global biometric identification service for remote parties, which subscribed to the global biometric identification service. Typically, the remote parties are organizations which lack a full end-to-end biometric identification system, implemented as a part of their computer network, intranet, web site, etc.

A remote party registered to the global biometric service, provides the operators of the apparatus biometric samples of end users of the remote party, and a user number, associated with each sample. The biometric sample may be an image of a fingerprint, a face image, or any sample of a biometric characteristic of a person, as known in the art. The user number may be assigned by the remote party to the sample. The user number serves to identify the sample as belonging to a certain end user of the remote party (or a certain group of end users). Optionally, the user number is selected from numbers allocated to the remote party by the system's operator, in advance.

For example, a drugstore may send the operators of the system a biometric sample (say a fingerprint image) of each member of the chain's staff. The small drugstore further sends an employee number, associated with biometric sample, without giving in any other detail identifying the employee (such as the name of the employee, or the national insurance number of the employee).

When the employee wishes to dispense a prescription narcotic pain reliever to a client, the employee has to put his finger in a finger reader. Preferably, the employee also has to enter a user number such as en employee number. The image of the finger is sent, via the internet, to the system (Optionally, with his employee number). The system processes the fingerprint image and identifies the fingerprint as belonging to employee number as previously received. The system sends the employee number to the computer system of the drugstore, thus providing a verification of the identity of the employee. The computer system of the drugstore identifies the employee as a pharmacist, using the employee number. Finally, the employee is allowed to dispense the narcotic drug to the client.

The principles and operation of a system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is block diagram illustrating a system for providing global biometric identification services to a plurality of remote parties, according to a preferred embodiment of the present invention.

The services may include:

authentication services—where there is established the validity of an end user attempting to gain access to a system, verification services—where there is established the validity of a claimed identity, and identification services—where the user is identified as a certain end user, previously registered with the system.

System 1000 for providing global biometric identification services to a plurality of remote parties includes a template receiver 110.

The remote parties may be, but are not limited to small businesses, organizations, etc, which lack a full end-to-end biometric identification system of their own, implemented as a part of their computer network, web site, etc.

The template receiver 110 includes a registration input and an inquiring input.

The template receiver 110 receives one or more registration templates of biometric samples, from a remote registering party 101, via the registration input. Each registration template belongs to an end user 111 of the remote registering party 101. The remote registering party 101 is one of the above parties, who subscribes to the global biometric identification services.

For example, the templates may be received through an offline interface (in a batch mode, say using a file containing a list of templates and a tag associated with each of the templates), an online interface (say, using a web site, or a client application installed at premises of the remote party), or through both the offline interface and the online interface.

A template of a biometric sample is a binary record created from distinctive information from a biometric sample such as a fingerprint image, a face image, an iris image, etc.

Preferably, the template is a condensed form of the biometric sample. That is to say, the condensed form comprises the results from some kind of analysis and summary of the biometric sample. For example, the template may be generated using an algorithm, which analyzes locations of minutia contained in fingerprints or a mathematical summary of the patterns in an iris image, as described in further detail hereinbelow.

Optionally, the template is a non-condensed binary representation of the biometric sample, such as a bitmap image of a fingerprint, or the image of a face. However, a non-condensed template may create unnecessary data transmission and processing overload on a system.

The templates may be of any type of a biometric sample, or a combination of types. For example, one biometric sample may be a fingerprint image, a second sample may be a face image, a third may me an image of an iris, etc.

The registering party 101 is a remote party, who wishes to register templates of biometric samples of his end users 111 (say his workers, customers, etc). The templates of the end users 111 are registered, so as to allow the identification, authentication or verification of the end user 111, as described in further detail hereinbelow. Through registering the end users 111, the end users 111 are enrolled in the system 1000.

For example, a registering party 101 may be a small business, such as a Golf Club. The club may register templates of face images of members 111 of the club's closed circle of clients with the system 1000. The club sends the system 1000 a registration template extracted from a face image associated with each of the client numbers 111. The registration templates are used for identification of a client immediate as the client arrives at the club, as described in further detail hereinbelow.

Thus, each of the templates sent by the registering party 101 is received with a respective tag, such as a user number. The tag identifies the template as belonging to an end user 111 of the registering party 101.

The template receiver 110 may also receive one or more test template(s) of (a) biometric sample(s) of a person 121 to be verified or identified as an end user of an inquiring party 102 who sends the template(s) of the sample(s) of the person 121.

The templates may be of any type of a biometric sample, or a combination of types. For example, one biometric sample may be a fingerprint image, a second sample may be a face image, a third may be an image of an iris, etc.

Optionally, the template of the person's biometric sample is received together with a claimed tag (say a user number) to be verified as belonging to the person 121.

An inquiring party 102 is one of the remote subscribing parties, subscribed to the services of the system 1000, who have biometric samples of their end users, stored in the storage 150, as described in further detail hereinabove. Optionally the Registration party and Inquiring party may be the same.

Preferably, the system 1000 further includes a template extractor 120, installed at premises of remote parties.

The template extractor 120 extracts a template from a biometric sample, taken from the end user 111, or a person 121 to be verified as an end user 111, as described in further detail hereinbelow. The templates are than sent to the system 1000, by the remote party.

Preferably, the template extractor 120 automatically identifies the type of a biometric characteristic sampled in the biometric sample. For example, the automatic identification may be carried out using an analysis of the general shape of the object in an image, be it a round shape of a human iris, a fingerprint which has a typical fingerprint shape, a face image consisting of eyes, nose, etc.

Then, the template extractor 120 may implement a template extraction algorithm which best fits the identified type of biometric characteristics sampled, as described in further detail hereinbelow.

Preferably, apparatus 1000 further includes a storage 150 connected to the template receiver 110. The storage 150 stores the template associated with the tag, for the registering party 101.

The apparatus 1000 further includes a verifier 140, connected to the template receiver, and the storage 150.

If the template is received from the inquiring party 102 without a claimed tag (say a user number), the verifier 140 determines a degree of match between the template of the biometric sample of the person and any of the templates stored for the inquiring party in the storage 150.

If the template is received from the inquiring party 102 with a claimed tag, the verifier 140 determines a degree of match between the template of the biometric sample of the person and any of the templates associated with the claimed tag. That is to say, the verifier 140 attempts to match the test template received from the inquiring party with templates associated with the tag.

The verifier 140 further verifies if the person is an end user of the inquiring party, based on the determined degree of match. Preferably, the verifier 140 may use a predefined policy for the verification.

For example, the predefined policy may include different minimal degrees of match, defined for each different end user, each different remote party, etc. Optionally, the template receiver 110 further receives the minimal degree of match from a remote party.

Optionally, the minimal degree of match is received from the inquiring party 102, associated with the specific test templates sent for the person 121, and used for the specific test templates only.

For example, if a bank wishes to verify the identity of an end user at an ATM (Automatic Teller Machine), the bank may send the system 1000 a low minimal degree of match when the ATM is in the end user's home town. However, the bank may send the system 1000 a higher minimal degree of match when the ATM is a town remote from the end user's home town.

Optionally, there may also be predefined a policy, for sampling of different types of biometric characteristics of the person. For example a policy may define sampling a fingerprint only in one case, and both a fingerprint and face image in another case. Optionally, the policy may be implemented through a multi-step process, as described in further detail hereinabove.

Preferably, the remote parties communicate with the sample receiver 110 and the verifier 140, via the-internet network 115.

Preferably, the verifier 140 also determines a degree of match between the test template of the biometric sample of the person 121 and any of the registration templates received from a registering party who has a predefined sharing agreement with the inquiring party 102. The verifier may identify or verify the person 121 as an end user of the party who has a sharing agreement with the inquiring party 102.

For examples, two nightclubs may have a sharing agreement. Consequently, each person, whose fingerprint's template is registered in the storage 150 for one of the clubs (say for implementing a blacklist of vandalistic clubbers), may also be identified, by sampling the fingerprint of the person, when the person arrives at the other club, as described in further detail hereinbelow.

Preferably, system 1000 further includes a time manager, connected to the verifier 140.

The time manager records time of reception of the test template of the biometric sample of the person. The time event is recorded for the tag (say a user number) associated with the template matched by the test template, by the verifier 140, as described in further detail hereinabove.

Optionally, the time manager sends data pertaining to the time events to a remote party, in a predefined format. The remote party may use the data for a time and attendance system, or forward the data to a third party providing a time and event system, as described in further detail hereinbelow.

Preferably, system 1000 further includes a duplicate templates locator, for locating duplicate templates in the storage 150.

The duplicate templates locator may also remove a duplicate template, and maintain a cross index, for referencing the remaining unique template using two or more tags of two or more remote parties.

Preferably, system 1000 further includes a quality monitor 190, connected with the template receiver 110 and the verifier 140, and deployed on a computer server not used to implement the template receiver 110 or the verifier 140.

The quality monitor 190 monitors the quality of service provided by the system 1000 through a predefined monitoring scheme. The monitoring scheme includes a sequence of operations, to be performed on the template receiver 110 and the verifier 140, and a desired response associated with each of the operations.

The quality monitor 190 samples the service, by automatically carrying out the predefined operations according to predefined monitoring scheme, comparing the desired result associated with the operation, and recording the operation and results in a log.

Preferably, the quality monitor 190 further sends a message (say an e-mail message, an SMS message, or any other messaging method known in the art) to predefine receiver, such as a system administrator, upon receiving and undesired result, according to a predefined scheme.

The quality monitor 190 may use a predefined scheme for sending the messages. The scheme defines when the message is to be sent, to whom, etc.

Preferably, system 1000 also includes a process manager, connected to the template receiver 110.

The process manager may be used to manage a predefined multi-step biometric identification process, where the remote party is prompted to provide a new test biometric sample in each stage, as described in further detail hereinbelow. Optionally, the remote party may also be prompted to provide a password from the biometrically sampled person, in one of the steps.

According to a preferred embodiment of the present invention, a system for providing global biometric identification services to a plurality of remote parties may also include a web site.

The web site provides a web based interface to a sample receiver 210, a template receiver 110, a verifier 140, etc.

The web site may be used to receive samples or templates from remote parties and register end users, for providing the results of biometric identification processes to a remote party, for providing operational and statistical reports to the parties (using a report generator, as known in the art), etc.

Figure 2:
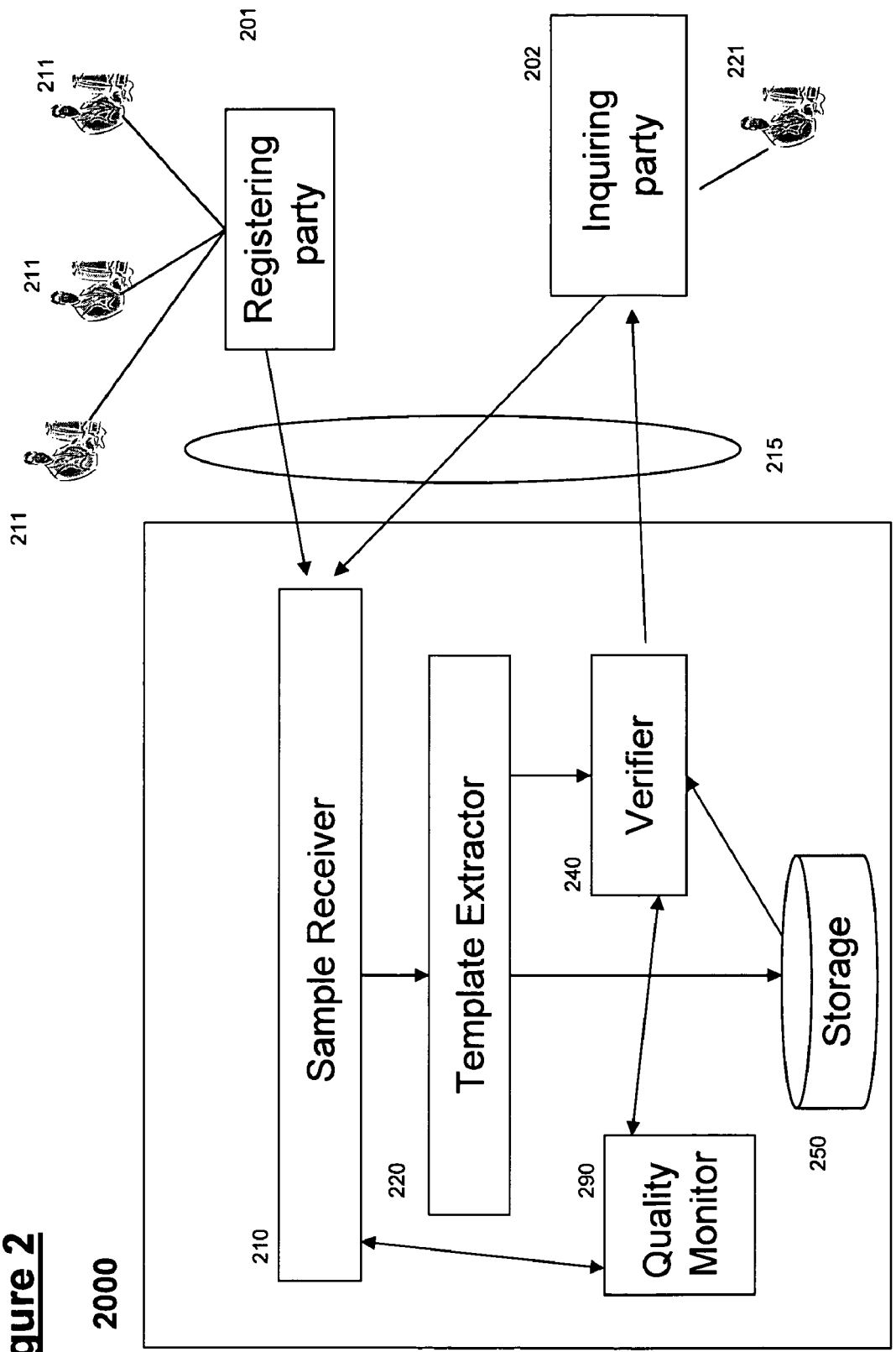
FIG. 2 is a block diagram illustrating a second system for providing global biometric identification services to a plurality of remote parties, according to a preferred embodiment of the present invention.

Reference is now made to FIG. 2, which is a block diagram illustrating a second system for providing global biometric identification services to a plurality of remote parties, according to a preferred embodiment of the present invention.

System 2000 for providing global biometric identification services to a plurality of remote parties includes a sample receiver 210. The sample receiver 210 includes a registration input and an inquiring input.

The remote parties may be, but are not limited to small businesses, organizations, etc, which lack a full end-to-end biometric identification system of their own, as described in further detail hereinabove.

The sample receiver 210 receives from a remote registering party 201 (one of the above parties), which is subscribed to the global biometric identification services, one or more registration biometric samples of a respective end user 211 of the remote registering party 201. The sample receiver 210 receives the registration samples, using the registration input.

The registration samples may be received through an offline interface, an online interface (say, using a web site or a client application installed at premises of the remote party), or through both the offline interface and on line.

The registering party 201 is a remote party, who wishes to register biometric samples of his end users (say his workers, customers, etc), so as to allow the identification or authentication of the end user, as described in further detail hereinabove.

Each of the registration biometric samples, sent by the registering party 201, may be received with a tag such as a user number associated with the sample. The tag identifies the biometric sample as belonging to an end user 211 of the registering party 201. Optionally, the tag is selected from tags assigned to the registering party, by an operator of the system 2000, in advance.

The sample receiver 210 also receives an inquiring biometric sample of a person 221, to be verified, or identified as an end user 221 of an inquiring party 202, the biometric sample is sent from. Optionally, the biometric sample is received with an associated claimed tag. The inquiring samples are received using the inquiring input.

System 2000 further includes a template extractor 120, connected to the sample receiver 210.

The template extractor 220 extracts a template from each of the biometric samples received from a registering party 201 or an inquiring party 202.

The system 2000 may further include a storage 250 connected to the template extractor 220. The storage 250 is used to stores the registration template associated with the tag, for the registering party 201.

The system 2000 further includes a verifier 240, connected to the template extractor 220 and the storage 250.

The verifier 240 determines a degree of match between the template extracted from the test biometric sample of the person 221 and templates stored for the inquiring party 202 in the storage 250. If the sample is received with the claimed tag (say, the a claimed user number), the verifier 240 determines the degree of match only between the template extracted from the biometric sample of the person 221 and templates stored for the inquiring party 202, which are associated with the claimed tag.

The verifier 240 further verifies if the person 221 is an end user of the inquiring party 202, based on the determined degree of match.

The verification result may be forwarded to the remote party. The remote party may have a client agent, installed at the premises of the remote party. The client agent may carry out a predefined operation, upon reception of a positive verification from the verifier 240. The predefined operation may include, but is not limited to: sending an e-mail message, playing a prerecorded message, open a door using an electric locking mechanism, etc.

Preferably, the remote parties communicate with the sample receiver 210 and the verifier 240, via the internet network 215.

Preferably, the verifier 240 also determines a degree of match between the test template extracted from the biometric sample of the person 221 and any of the registration templates stored for a registering party who has a predefined sharing agreement with the inquiring party 202. The verifier 240 may verify or identify the person 221 as an end user of the party who has a sharing agreement with the inquiring party 202.

Preferably, the system 2000 further includes a time manager, which communicates with the verifier 240. The time manager records time of reception of the test biometric sample of the person. The time event is recorded for the tag associated with the template matched by the template extracted from the biometric sample of the person, by the verifier 240, as described in further detail hereinabove.

Optionally, the time manager sends data pertaining to the time events to a remote party, in a predefined format. The remote party may use the data for a time and attendance system, or forward the data to a third party providing a time and event system, as described in further detail hereinbelow.

Preferably, system 2000 further includes a quality monitor 290 connected with the sample receiver 210 and the verifier 240, and deployed on a computer server not used the template receiver 210 or the verifier 240.

Preferably, system 2000 further includes a duplicate templates locator, for locating duplicate templates in the storage 250, as described in further detail hereinabove.

The quality monitor 290 monitors the quality of service provided by the system 2000 through a predefined monitoring scheme. The monitoring scheme includes a sequence of operations, to be performed on the sample receiver 210 and the verifier 240, and a desired response associated with each of the operations.

The quality monitor 290 samples the service, by automatically carrying out the predefined operations according to a predefined monitoring scheme, comparing the desired result associated with the operation, and recording the operation and results in a log.

Preferably, the quality monitor 290 further sends a message (say an e-mail message, an SMS message, or any other messaging method known in the art) to predefine receiver, such as a system administrator, upon receiving and undesired result, according to a predefined scheme.

The quality monitor 290 may use a predefined scheme for sending the messages. The scheme defines when the message is to be sent, to whom, etc.

Figure 3:
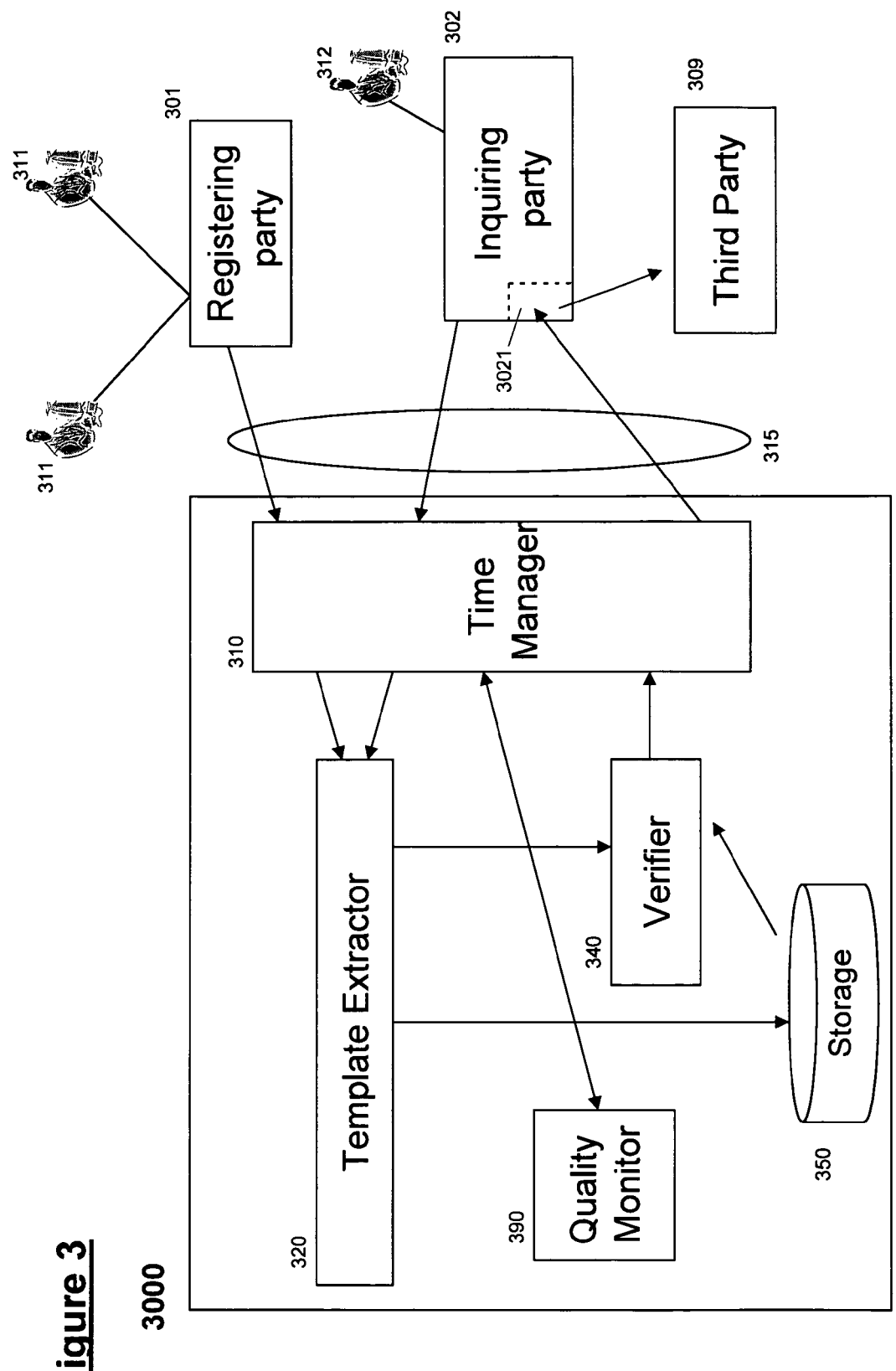
FIG. 3 is a block diagram illustrating a third system for providing global biometric identification services to a plurality of remote parties, according to a preferred embodiment of the present invention.

Reference is now made to FIG. 3, which is a block diagram illustrating a third system for providing global biometric identification services to a plurality of remote parties, according to a preferred embodiment of the present invention.

Optionally, system 3000 is used to provide biometric services for time and attendance systems, as described in further detail hereinbelow.

System 3000 for providing global biometric identification services to a plurality of remote parties includes a time manager 310.

Preferably, the time manager 310 communicates with remote parties, through the Internet 315. More preferably, the time manager 310 is provided an interface in a web site. Using the interface, a party may interact with the time manager 310 through the web site, for providing data pertaining to biometric samples of end users, biometric samples of persons to be identified as end users of the party, etc, as described in further detail hereinbelow.

The time manager 310 receives from a remote registering party 301 (one of the above parties), which is subscribed to the global biometric identification services, one or more biometric samples of a respective end user 311 of the remote registering party 301.

The registering party 301 is a remote party, who wishes to register biometric samples of his end users 311 (say his workers), so as to allow the identification, authentication or verification of the end user 311, as described in further detail hereinabove.

Each of the biometric samples, sent by the registering party 301, may be received with a user number assigned by the registering party 301. The user number relates the biometric sample to an end user 311 of the registering party 301.

The sample receiver 310 also receives a biometric sample of a person 312, to be verified, or identified as an end user (such as an employee) of an inquiring party 302, the biometric sample is sent from. Optionally, the sample is received with a claimed user number.

System 3000 further includes a template extractor 320, connected to the time manager 310.

The template extractor 320 extracts a template from each of the biometric samples received from a registering party 301 or an inquiring party 302.

The system 3000 may further include a storage 350 connected to the template extractor 320. The storage 350 is used to store the template associated with the user number, for the registering party 301.

The system 3000 further includes a verifier 340, connected to the template extractor 320 and the storage 350.

The verifier 340 determines a degree of match between the template extracted from the biometric sample of the person 312 and templates stored for the inquiring party 302 in the storage 350. If the sample of the person 312 is received with a claimed user number, the verifier 340 determines the degree of match between the template extracted from the biometric sample of the person 312 and templates stored associated with the claimed user number.

The verifier 340 further verifies if the person 312 is an end user of the inquiring party 302, based on the determined degree of match.

Preferably, the verifier 340 also determines a degree of match between the template extracted from the biometric sample of the person 312 and any of the templates stored for a biometric partner. The biometric partner is a registering party, who has a predefined sharing agreement with the inquiring party 302. The verifier may verify or identify the person 312 as an end user of the party who has a sharing agreement with the inquiring party 302.

Preferably, the time manager 310, communicates with the verifier 340, for receiving the number of the end user of the inquiring party 302, whose user number are associated with the templates matched by the verifier 340.

The time manager 310 records time of reception of the biometric sample of the person 312. The time event is recorded for the user number associated with the template matched by the template extracted from the biometric sample of the person, as described in further detail hereinabove.

Optionally, the time manager 310 sends data pertaining to the time events to a remote party such as the inquiring party 302, in a predefined format. The time events may indicate when a certain end user arrives at, or leaves the premises of the remote party 302. The remote party 302 may use the data for a time and attendance system, or forward the data to a third party 309 providing a time and event system, as described in further detail hereinbelow.

Preferably, the remote party 302 has a client agent 3021, installed at the premises of the remote party 302, for receiving the data pertaining to time events of end users of the remote party 3021. The agent 3021 may forward the data to a third party 309, in a predefined format.

Preferably, system 3000 further includes a duplicate template locator, for locating duplicate templates in the storage 350. Optionally, the duplicate template locator removes the duplicate templates. The duplicate template locator may also cross-index the remaining unique template, for different parties, as described in further detail hereinabove.

Preferably, system 3000 further includes a quality monitor 390.

The quality monitor 390 communicates with the time manager 310. The quality monitor 390 is deployed on a computer server not used by the time manager 310.

The quality monitor 390 monitors the quality of service provided by the system 3000, through a predefined monitoring scheme. The monitoring scheme includes a sequence of operations, to be performed on the time manager 310, and a desired response associated with each of the operations.

The quality monitor 390 samples the service, by automatically carrying out the predefined operations, according to a predefined scheme, comparing the desired result associated with the operation, and recording the operation and results in a log.

Preferably, the quality monitor 390 further sends a message (say an e-mail message, an SMS message, or any other messaging method known in the art) to predefine receiver, such as a system administrator, upon receiving and undesired result, according to a predefined scheme.

The quality monitor 390 may use a predefined scheme for sending the messages. The scheme defines when the message is to be sent, whom the message is to be sent to, etc.

Figure 4:
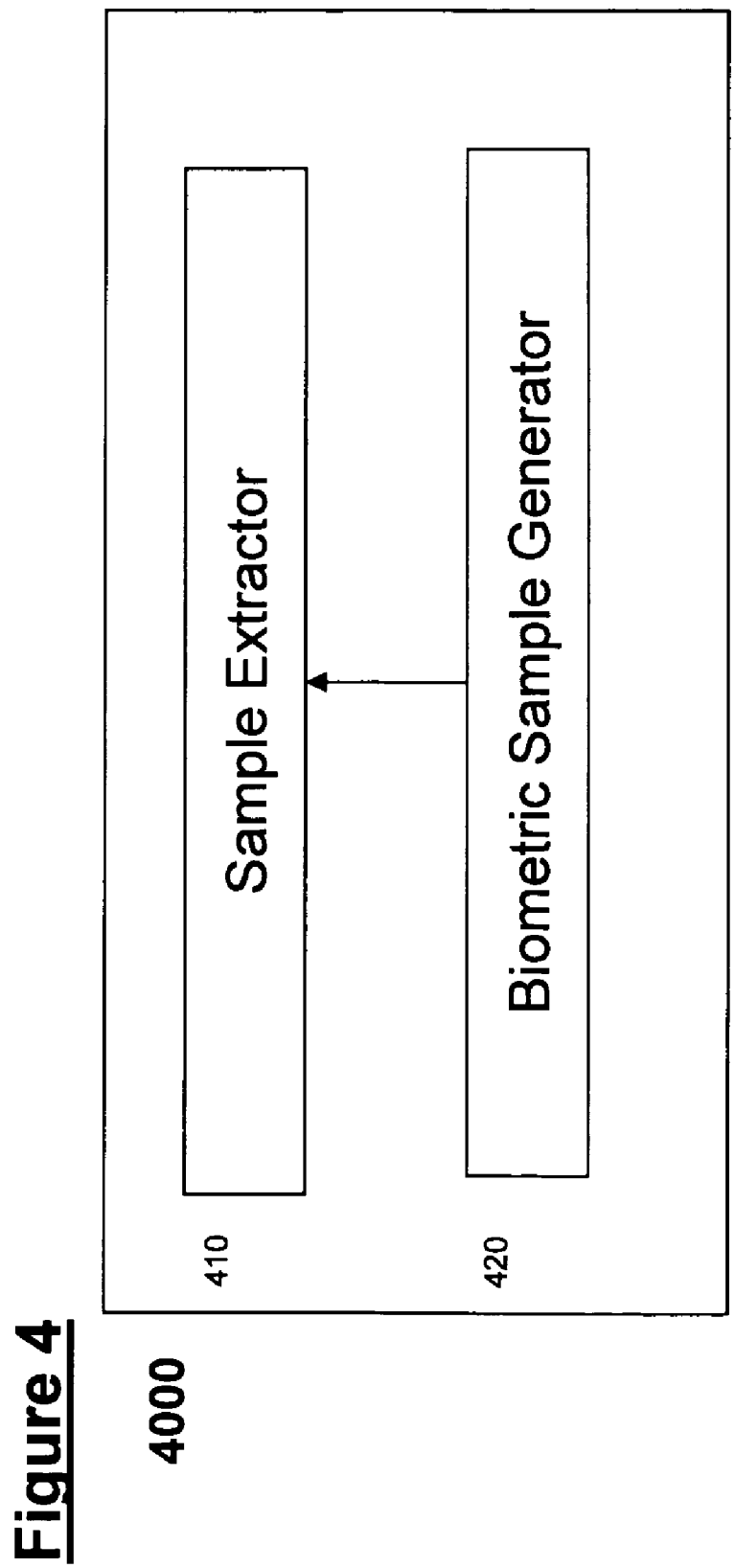
FIG. 4 is a block diagram illustrating a client agent for providing global biometric identification, embodied on a computer readable medium, according to a preferred embodiment of the present invention.

Reference is now made to FIG. 4, which is a block diagram illustrating a client agent for providing global biometric identification, embodied on a computer readable medium, according to a preferred embodiment of the present invention.

A computer readable medium 4000, such as a USB Memory, a disc, etc, may embody a template extractor 410.

The template extractor 410 may extract a one or more template from a biometric sample, and to send the extracted template to a remote receiver, say system 3000, as described in further detail hereinabove.

Preferably, the template extractor 410 automatically determines which type of biometric characteristic is sampled in the received biometric sample, and extracts the template from the biometric sample, in accordance with the determined type of biometric characteristic sampled, as described in further detail hereinbelow.

For example, if the template extractor 410 determines that the sample is of a fingerprint, the template extractor 410 may use a fingerprint template generation algorithm, as described in further detail hereinbelow. If the template extractor 410 determines that the sample is of an iris of a person, the template extractor 410 may use a human iris template generation algorithm, etc.

Preferably, the client agent 4000 also includes a biometric sample generator 420, connected to the template extractor 410.

The biometric sample generator 420 generates the biometric sample, utilizing a biometric reader.

Preferably, the biometric sample generator 420 identifies which type(s) of a biometric reader is available in a computer system installed with the agent 4000.

The biometric sample generator 420 generates the biometric sample, utilizing the biometric reader, in accordance with the identified type of the biometric reader.

That is to say, the biometric sample generator 420 includes a variety of functions, for generating the sample from a variety of sample readers, as known in the art. The biometric sample generator 420 may choose a function from amongst the functions, in accordance with the identified type of the biometric reader.

For example, the biometric sample generator 420 may be include a variety of biometric reader drivers and biometric imaging software modules, and choose the driver and functions, according to the identified biometric reader(s) available.

Figure 5:
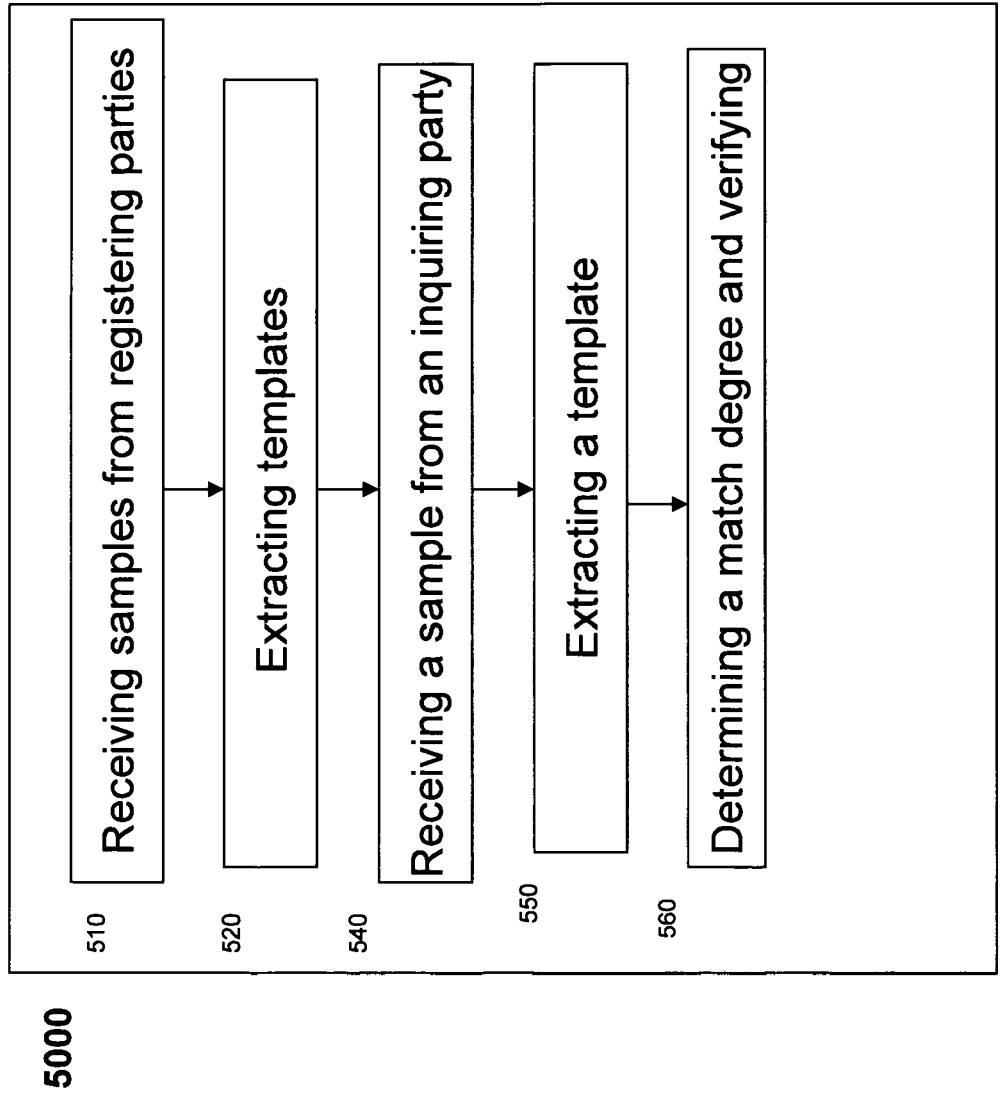
FIG. 5 is a flowchart illustrating a method for providing global biometric identification services to a plurality of remote parties, according to a preferred embodiment of the present invention.

Reference is now made to FIG. 5, which is flowchart illustrating a method for providing global biometric identification services to a plurality of remote parties, according to a preferred embodiment of the present invention.

According to method 5000, one or more registration biometric samples of an end user(s) of a remote registering party are received 510 from the remote registering parties. The biometric sample is received associated with a tag such as a user number. The tag identifies the biometric sample as belonging to an end user of the registering party, as described in further detail hereinabove.

Preferably, each of the tags is a tag allocated to the registering party operators of the system, in advance. For example, each remote party may be provided with a number of magnetic cards. Each card bears a unique user number allocated by the system 1000. When registering an end user of the party, the end user is given one of the cards, and the number on the card is sent to the system with a template of the end user's biometric sample. The template is stored associated with the number, as described in further detail hereinabove.

Optionally, the user number is rather determined by the remote registering party. The user number may be assigned an internal system number upon being received, by the sample receiver 210 or template receiver 110.

Next, there is extracted 520 a template from each of the received biometric samples, say using the template extractor 220 described hereinabove.

Optionally, the extracted templates are stored associated with the tag (say, the user numbers) in a storage device, for the registering party. The storage device may be a computer hard disc, a flash memory device, etc, as known in the art.

When a test biometric sample of a person is received 540 from a remote inquiring party, a template is extracted 550 from the person's biometric sample, say using the template extractor 220 described hereinabove. Optionally, the biometric sample of the person is received together with a claimed tag, such as claimed user number.

Next, there is determined 550 a degree of match between the template, extracted from the test biometric sample of the person, and one or more of the templates stored for the inquiring party. If the sample is received with a claimed tag, only templates stored associated with the claimed tag are used for determining the degree of match.

Finally, there is verified 550 if the person is an end user, using the determined degree of match.

Preferably, method 5000 further includes communicating with the remote parties via the Internet, say using an interface in a web site, as described in further detail hereinabove.

Optionally, method 5000 further comprises recording time of reception of the biometric sample of the person. The time of reception is recorded as a time event of the tag (say the user number) associated with the template matched by the template extracted from the person's biometric sample, as described in further detail hereinabove.

Preferably, the method 5000 further includes sending data pertaining to the time events of the user number to a remote party.

Optionally, the method 5000 further includes determining a degree of match between the template extracted from the person's biometric sample and one or more templates stored for a biometric partner. The biometric partner is a registering party who has a sharing agreement with the inquiring party. The person may be identified or verified as an end user of the biometric partner, using said determined degree of match.

Figure 6:
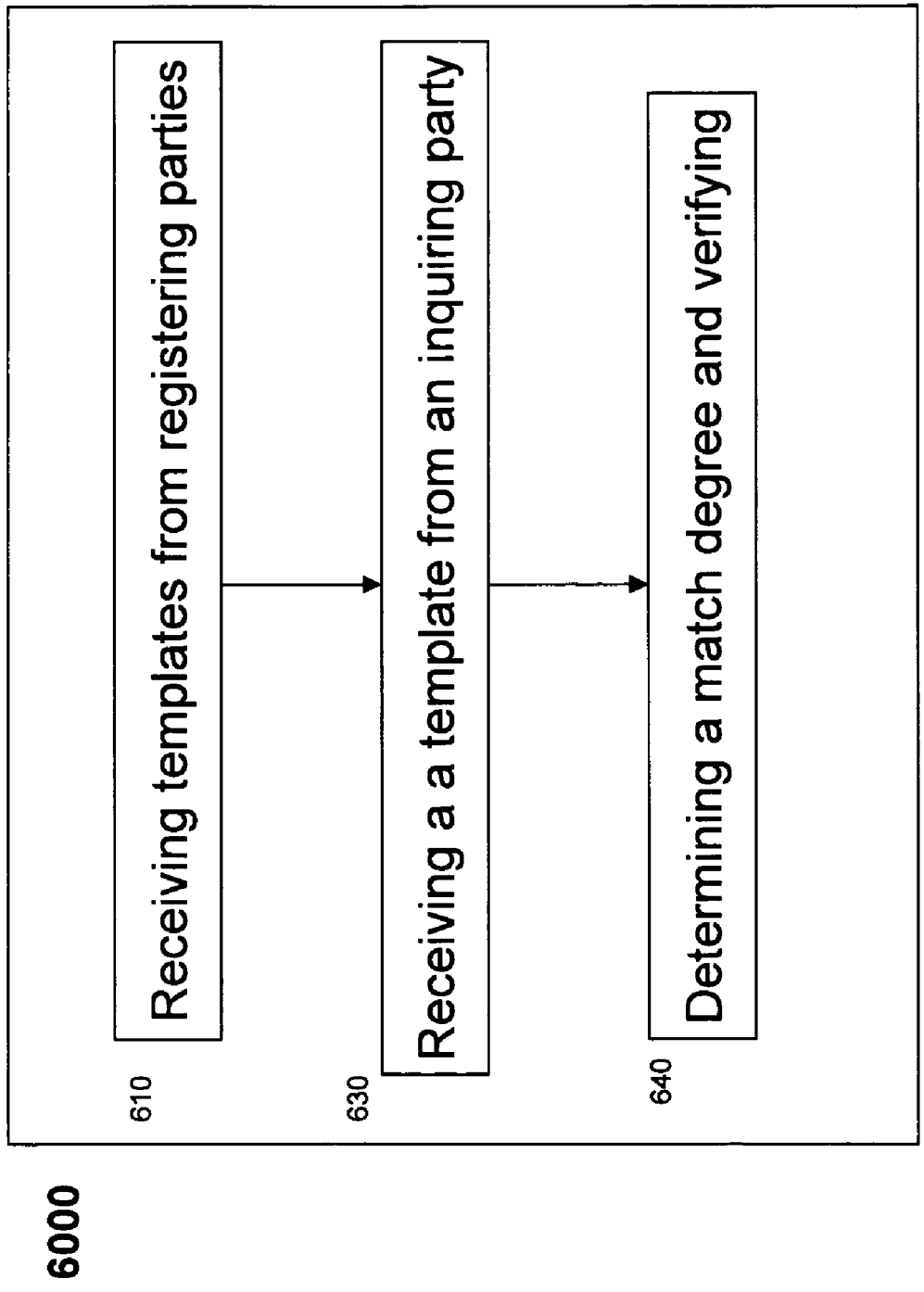
FIG. 6 is a flowchart illustrating a second method for providing global biometric identification services to a plurality of remote parties, according to a preferred embodiment of the present invention.

Reference is now made to FIG. 6, which is flowchart illustrating a second method for providing global biometric identification services to a plurality of remote parties, according to a preferred embodiment of the present invention.

According to method 6000, one or more templates of biometric samples of an end user(s) of a remote registering party are received 610 from the remote registering parties, say using the sample receiver 110, described in further detail hereinabove.

The biometric template is received associated with a tag, say a user number. The user number identifies the biometric sample as belonging to an end user of the registering party. The identification of the template as belonging to the end user, the template is related to the end user, as described in further detail hereinabove.

Optionally, the received templates are stored 620 associated with the user numbers in a storage device, for the registering party. The storage device may be a computer hard disc, a flash memory device, a Random Access Memory (RAM), or any other storage device, as known in the art.

A template of a biometric sample of a person may be received 630 from a remote inquiring party, say using the sample receiver 110. Preferably, the template is received with a claimed user number.

Upon reception of the template of person's biometric sample, there is determined 640 a degree of match between the template extracted from the biometric sample of the person and one or more of the templates stored for the inquiring party. If the template is received with a claimed user number, only templates stored associated with the claimed user number are used for determining the degree of match.

Finally, there is verified 640 if the person is an end user of the inquiring party, using the determined degree of match, say using the verifier 140, as described in further detail hereinabove.

Preferably, method 6000 further includes communicating with the remote parties via the Internet, say using an interface in a web site, as described in further detail hereinabove.

Optionally, method 6000 further comprises recording time of reception of the biometric template of the person's biometric sample. The time of reception is recorded as a time event of the user number associated with the template matched by the template of the person's biometric sample, as described in further detail hereinabove.

Preferably, the method 6000 further includes sending data pertaining to the time events of the user number to a remote party.

Optionally, the method 6000 further includes determining a degree of match between the template of the biometric sample of the person and one or more templates stored for a biometric partner. The biometric partner is a registering party who has a sharing agreement with the inquiring party. The person may be identified or verified as an end user of the biometric partner, using said determined degree of match, as described in further detail hereinabove.

Figure 7:
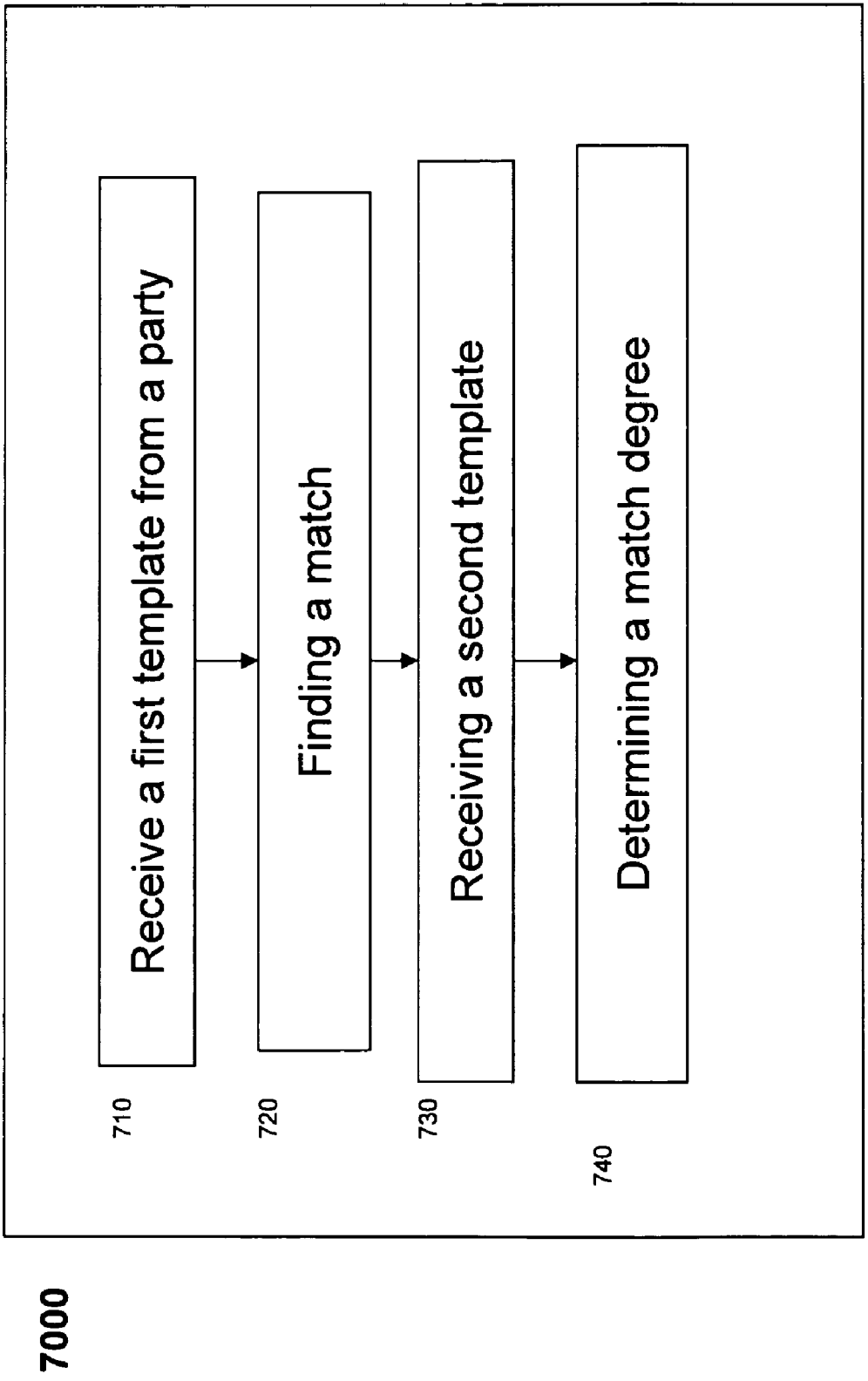
FIG. 7 is a flowchart illustrating a third method for providing global biometric identification services to a plurality of remote parties, according to a preferred embodiment of the present invention.

Reference is now made to FIG. 7, which is a flowchart illustrating a third method for providing global biometric identification services to a plurality of remote parties, according to a preferred embodiment of the present invention.

According to method 7000, there is carried out a multi-step interaction with an inquiring party, for providing a more accurate and reliable biometric identification service.

For example, a first biometric sample (or a template of a biometric sample) is received 710 from an inquiring party, say using the sample receiver 210 or template receiver 110, as described in further detail hereinabove. The inquiring party takes the sample from a person claiming to be one of the end users (clients, employees, club members, etc) of the party.

Next, all templates previously stored for the inquiring party, as described in further detail hereinabove, are searched for templates matching 720 with the template now received from the inquiring party.

Then, the inquiring party is prompted for sending a second sample from the person. Preferably the two samples differ with respect to the type of biometric characteristic sampled. For example, the first characteristic may be a fingerprint, whereas the second characteristic is a human face.

Upon receiving 730 the second sample (or template), there is determined the degree of match between the template of the second sample, and templates stored associated with a user number, which is also associated with the templates matched 720 with the first sample's template, as described in further detail hereinabove.

Naturally, the match finding of the second sample's template is much faster, as only templates stored for the user number are used. Thus an increased level of accuracy and reliability is achieved, for a relatively low price, in terms of processing and response time.

Figure 8:
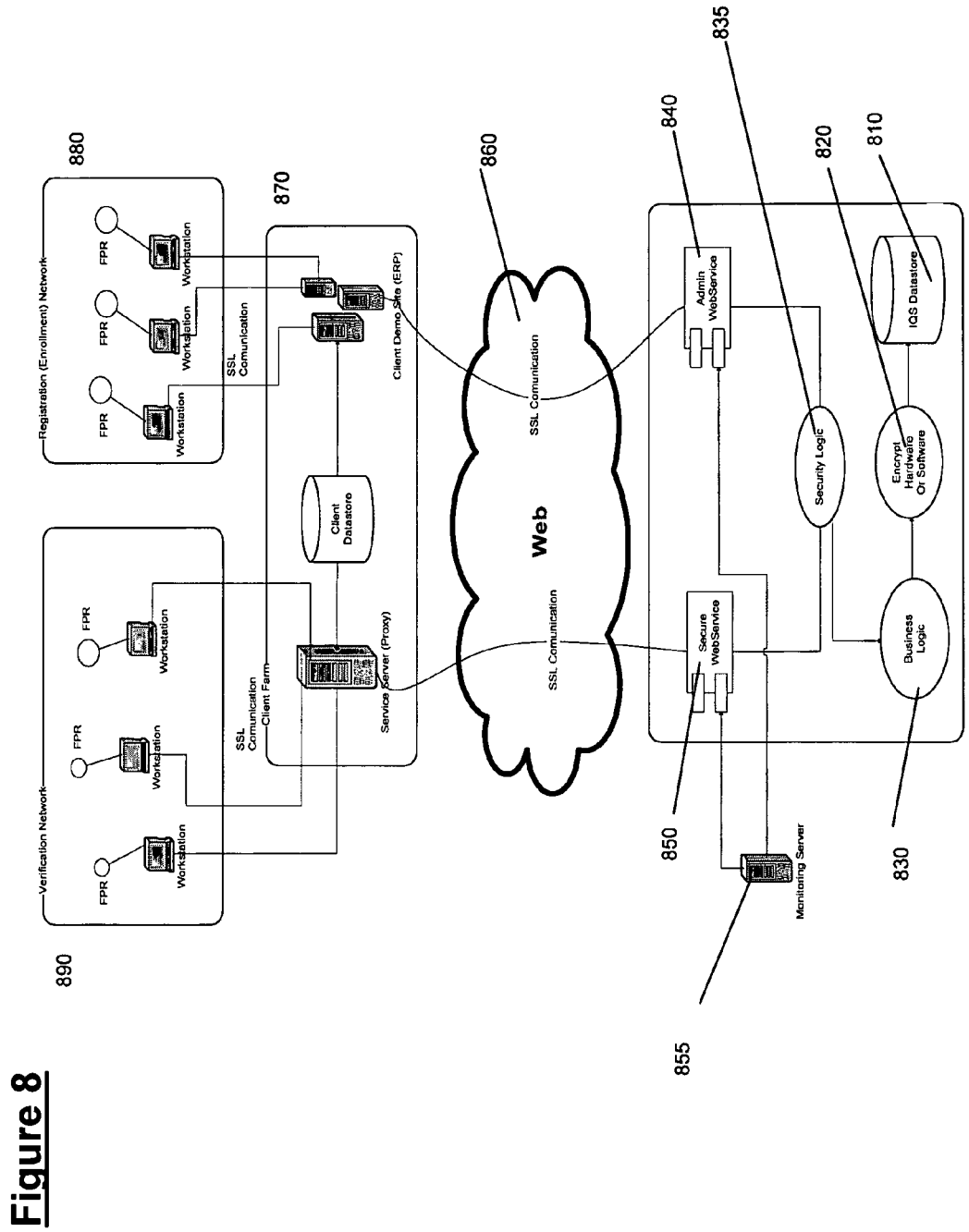
FIG. 8 is a block diagram illustrating exemplary web based architecture, for a system providing global biometric identification services to a plurality of remote parties, according to a preferred embodiment of the present invention.

Reference is now made to FIG. 8, which is a block diagram illustrating exemplary web based architecture, for a system providing global biometric identification services to a plurality of remote parties, according to a preferred embodiment of the present invention.

A system, according to a preferred embodiment of the present invention, may be implemented in a multi-layered architecture, including but not limited to the following layers:

- a database layer 810 for managing the access to a database of templates stored associated with user numbers, as described in further detail hereinabove.
- a cryptography layer 820, for coding and encryption of stored data (such as the templates and user numbers), using a dedicated hardware device or software.
- a business logic 830, implementing the biometric identification methods described hereinabove.

a security logic layer 835, for securing access to the business logic layer 830 described above, and to the administration layer 840 and web services layer 850, described below.

an administration layer 840 for carrying out administration and configurative tasks in the system. The administrative layer 840 also carries out administration and configurative tasks in networks of remote parties 870, via the web 860, using an SSL communication link, as known in the art.

a secure web service layer 850, for communicating biometric data with the remote parties, as described in further detail hereinabove. The data is communicated using an SSL communication link, as known in the art.

A monitoring server 855, installed with a quality monitor 190, as described in further detail hereinabove.

At the side of a remote party, the architecture may include a central network 870, including central entities: a client database server, client applications such as a demo or an ERP (Enterprise Resource Management) server, a service server, etc.

The architecture may further include, a party registering network—used for by the remote party for biometrically sampling end users, to be registered by the party in the system, and a party verification network—for sampling persons to be verified as end users of the remote party, as described in further detail hereinabove. Optionally, the two networks 880-890 may be merged. The two networks 880-890 may also be merged with the central network 870, thereby creating a single networked architecture at the side of the remote party.

Figure 9:
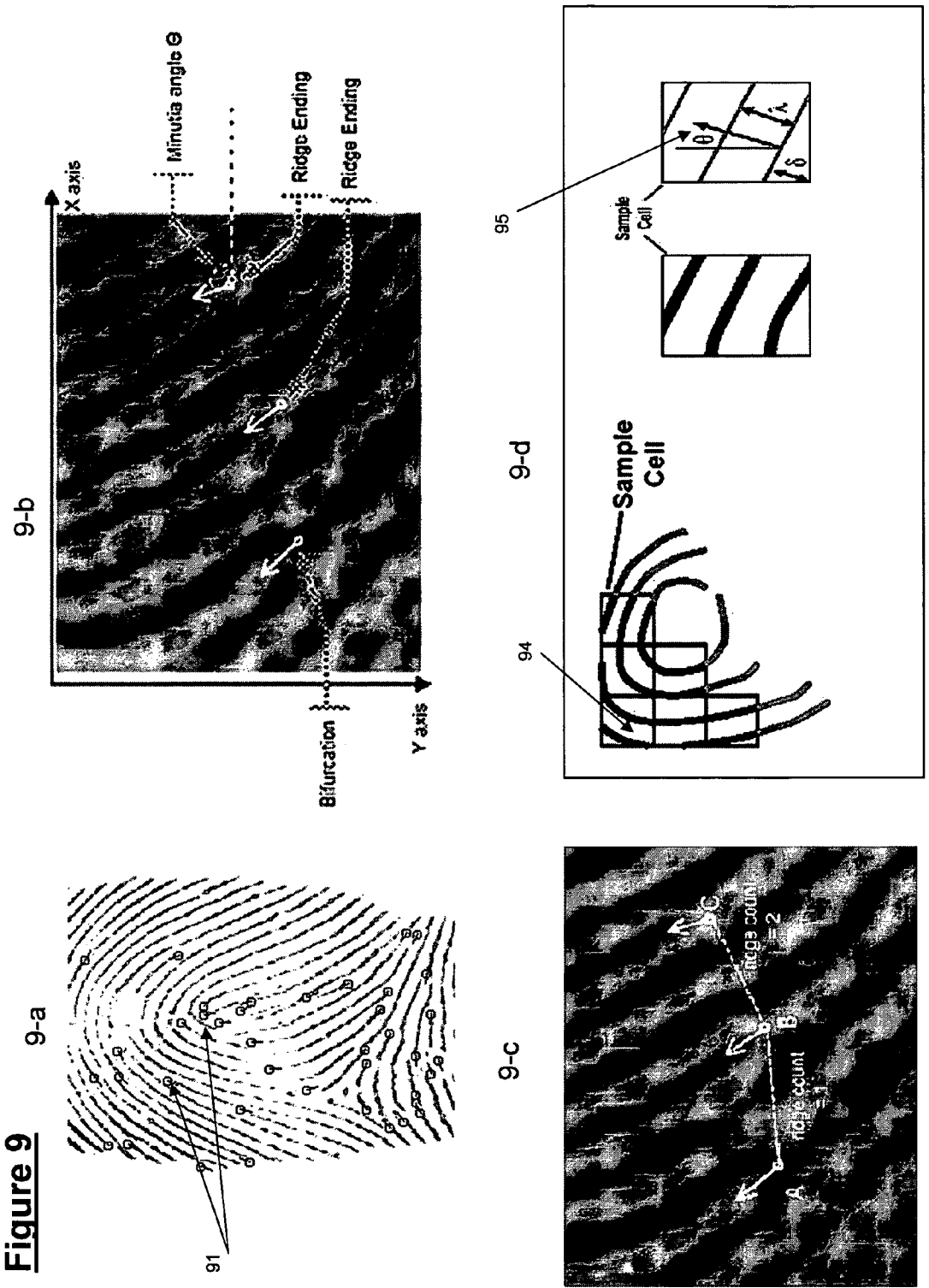
FIG. 9 illustrates template extraction from fingerprint images, according to a preferred embodiment of the present invention.

Reference is now made to FIG. 9, which illustrates template extraction from fingerprint images, according to a preferred embodiment of the present invention.

The template extractors described hereinabove may use any of known in art algorithms for generating templates from a biometric sample. The biometric sample may be a fingerprint image, an iris image, etc.

For example, a fingerprint is made of a series of ridges and furrows on the surface of the finger. The uniqueness of a fingerprint may be determined by the pattern of ridges and furrows as well as the minutiae points 91, as illustrated in FIG. 9-a. Minutiae points 91 are local ridge characteristics that occur at either a ridge bifurcation or a ridge ending.

Algorithms for generating templates from a fingerprint may be placed into two categories: minutiae-based and correlation based.

Minutiae-based algorithms first find minutiae points and then map their relative placement on the finger, with respect to position and direction, as illustrated in FIG. 9-b. For example, some algorithms count the number of ridges between particular points, generally the minutiae, as illustrated in FIG. 9-c. The numbers are than stored in a template.

Correlation based algorithms use the general shape of the ridges. The fingerprint is divided in small sectors 94. The ridge direction, phase and pitch in each sector is extracted 95, and the binary representation of each sector is stored in a predefined position in a template, as illustrated using FIG. 9-d.

The exemplary systems and methods, described hereinabove, may have a variety of applications.

For example, dance bars in one country may share a blacklist of trouble making visitors, utilizing sharing agreements, as described in further detail hereinabove.

A night club manager may be able to constantly monitor the numbers of female and male clubbers inside the club, and balance the numbers (allowing entrance only to girls when there are more boys inside, and vise versa).

In another example, the biometric services described hereinabove may also be used in elections, to monitor the voting.

In yet another example, the biometric services provide by systems and methods described hereinabove, may be used for preventing profiteering by selling Football tickets in the black market.

Figure 10:
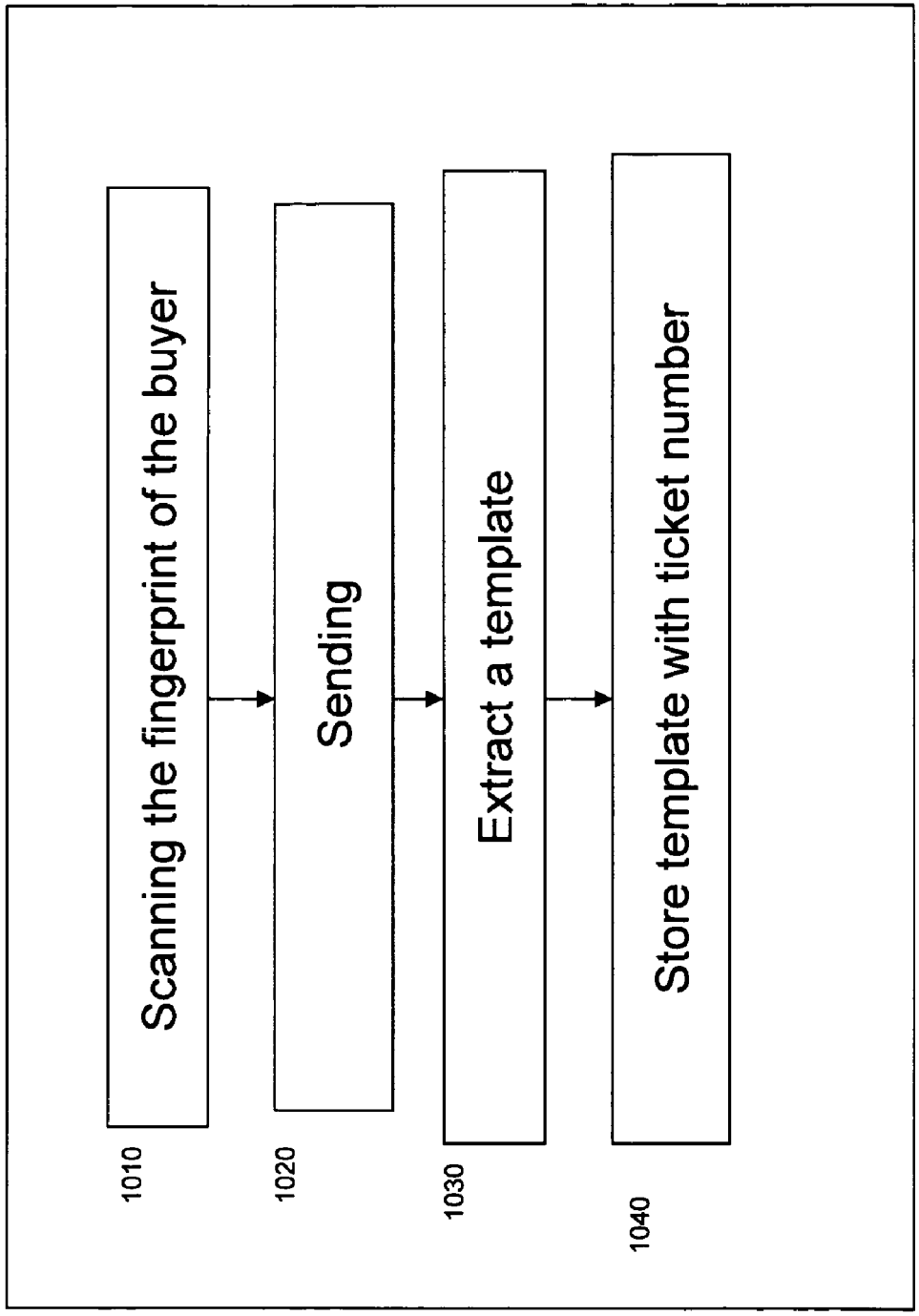
FIG. 10 is a flowchart illustrating a method for selling a ticket and biometrically sampling the buyer, according to a preferred embodiment of the present invention.

Reference is now made to FIG. 10, which is a flowchart illustrating a method for selling a ticket and biometrically sampling a buyer, according to a preferred embodiment of the present invention.

An original buyer of a ticket is biometrically scanned 1010, say by taking the fingerprint of the buyer. The sample is sent 1020 to the system, which extracts 1030 a template from the sample. The template is stored 1040 associated with a unique ticket number, as described in further detail hereinabove.

Figure 11:
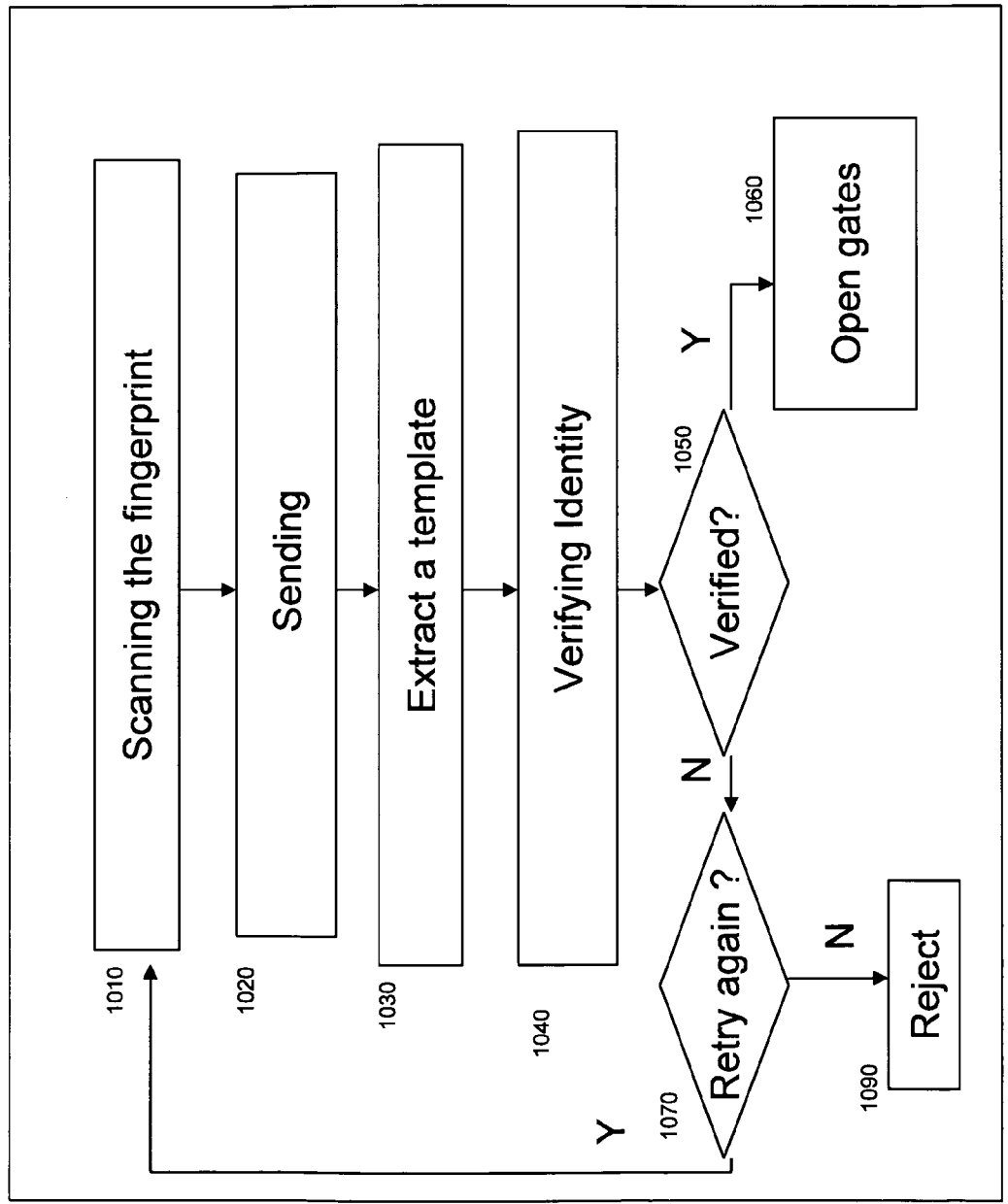
FIG. 11 is a block diagram illustrating a method for verifying the identity of a ticket buyer, according to a preferred embodiment of the present invention.

Reference is now made to FIG. 11, which is a block diagram illustrating a method for verifying the identity of a ticket owner, according to a preferred embodiment of the present invention.

Upon arrival of a ticket owner in the stadium, a biometric sample (say, a fingerprint) is taken 1110 from the owner. The sample is sent 1120 to the system, together with the ticket number. The system extracts 1130 a template for sample. The system verifies 1140 if the owner of the ticket is the original buyer of the ticket. The verification is carried out by determining a degree of match between the template extracted 1130 from the owner's biometric sample, and the template stored associated with the ticket number, as described in further detail hereinabove.

If the owner is verified 1150 as the original buyer of the ticker, the gates are opened 1160 for the owner who enters the stadium. Otherwise, the owner may be allowed to try again 1170, say for a predetermined number of times, until a final rejection is issued 1190, upon which the ticket is marked as invalid.

In a similar example, movie tickets may be bought through a web page, and a fingerprint may be taken from each buyer and be associated with the ticket number. The fingerprint and the ticker number are sent to the system, and stored, as described in further detail hereinabove. When the buyer arrives at the cinema theater, the buyer is fingerprinted. If the template of the fingerprint taken from the buyer matches the template of the fingerprint associated with the ticket, the ticket is printed, and the buyer may enjoy the movie.

Other applications may involve registering tourists in hotels, with biometric samples, and providing the tourists services such as dinners and attractions by identifying the tourists, using the samples, providing biometric identification services to web sites, etc.

It is expected that during the life of this patent many relevant devices and systems will be developed and the scope of the terms herein, particularly of the terms "Biometric Reader", "Web", and "Network", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. System for providing global biometric identification services to a plurality of remote parties, the system comprising:
   a template receiver, comprising
   a) a registration input configured to receive from at least one remote registering party communicating with said template receiver, at least one registration template complete as originally extracted from a respective biometric sample of an end user of said remote registering party, associated with a tag relating said registration template to said end user; and
   b) an enquiry input, configured to receive from a remote inquiring party communicating with said template receiver, at least one test template complete as originally extracted from a respective biometric sample of a person; and
   a verifier, associated with said template receiver, configured to determine a degree of match between said registration template and said test template, by directly comparing the registration template complete as originally extracted with the test template complete as originally extracted, thereby to verify said person as an end user, using said determined degree of match.

2. The system of claim 1, wherein said template receiver is further configured to receive a plurality of registration templates from said registering party.

3. The system of claim 1, wherein said template receiver is further configured to communicate with said remote parties via the Internet.

4. The system of claim 1, further comprising a template extractor, remotely communicating with said template receiver, installed at premises of at least one of said remote parties and configured to extract said test template from a biometric sample.

5. The system of claim 4, further comprising a biometric sample generator associated with said template extractor, configured to generate a biometric sample, utilizing a biometric reader, and forward said biometric sample to said template extractor.

6. The system of claim 4, further comprising a biometric sample generator associated with said template extractor, configured to identify a type of a biometric reader, and generate a biometric sample, utilizing said biometric reader, in accordance with said identified type.

7. The system of claim 1, further comprising a template extractor, remotely communicating with said template receiver, installed at premises of at least one of said remote parties, and configured to automatically determine which type of biometric characteristic is sampled in a biometric sample, and extract said test template from said biometric sample according to said determined type.

8. The system of claim 7, further comprising a biometric sample generator associated with said template extractor, configured to generate a biometric sample, utilizing a biometric reader, and forward said biometric sample to said template extractor.

9. The system of claim 7, further comprising a biometric sample generator associated with said template extractor, configured to identify a type of a biometric reader, and generate a biometric sample, utilizing said biometric reader, in accordance with said identified type.

10. The system of claim 1, further comprising a time manager, associated with said verifier, and configured to record time of reception of said test template, as a time event of said tag associated with said registration template matched by said test template.

11. The system of claim 1, wherein said inquiry input is further configured to receive a plurality of test templates of biometric samples of said person, and said verifier is further configured to determine a degree of match between said test templates of biometric samples of said person and at least one of said registration templates, and to verify said person as an end user, using said determined degree of match.

12. The system of claim 11, wherein said test templates comprise test templates. from at least two types of biometric samples.

13. The system of claim 11, wherein said verifier is further configured to match between a first one of said plurality of test templates and at least one of said registration templates, and determine a degree of match between a second one of said plurality of test templates and at least one of said registration templates associated with a tag also associated with at least one of said templates matched with said first template.

14. The system of claim 1, wherein said template receiver is further configured to receive a claimed tag associated with said test template of said person, and said verifier is further configured to determine a degree of match between said test template of said person and at least one of said registration templates associated with said claimed tag, and to verify said person as an end user, using said determined degree of match.

15. The system of claim 1, wherein said verifier is further configured to determine a degree of match between said test template of said person and at least one of said registration templates stored for a registering party having a sharing agreement with said inquiring party, and to verify said person as an end user, using said determined degree of match.

16. The system of claim 1, further comprising a quality monitor, communicating with said template receiver and said verifier, and configured to monitor operation of the system through a predefines monitoring scheme.

17. The system of claim 1, further comprising a storage associated with said registration input, for storing said registration template associated with said tag.

18. The system of claim 17, further comprising a duplicate templates locator, associated with said storage, and configured to locate duplicate templates in the storage.

19. The system of claim 17, further comprising a duplicate templates locator, associated with said storage, and configured to locate a duplicate template in the storage, and to remove said duplicate template.

20. The system of claim 1, further comprising a process manager, connected to said inputs, and configured to communicate a remote party for managing a multi-step biometric identification process.

21. The system of claim 1, further comprising a process manager, connected to said inputs, and configured to communicate with a remote party for managing a multi-step biometric authentication process.

22. The system of claim 1, wherein said verifier is further configured to use a predefined policy, for said verifying using said determined degree of match.

23. The system of claim 1, wherein said verifier is further configured to use a predefined policy, for said verifying using said determined degree of match, said policy comprising an end user specific minimal degree of match for said verification.

24. The system of claim 1, wherein said verifier is further configured to use a predefined policy, for said verifying using said determined degree of match, said policy comprising a remote party specific minimal degree of match for said verification.

25. The system of claim 1, wherein said template receiver is further configured to receive a minimal degree of match from said inquiring party, and said verifier is further configured to use said received minimal degree of match for said verifying using said determined degree of match.

* * * * *